(No Model.) 3 Sheets—Sheet 1.
F. KLEEMANN.
FILTER PRESS.
No. 434,831. Patented Aug. 19, 1890.
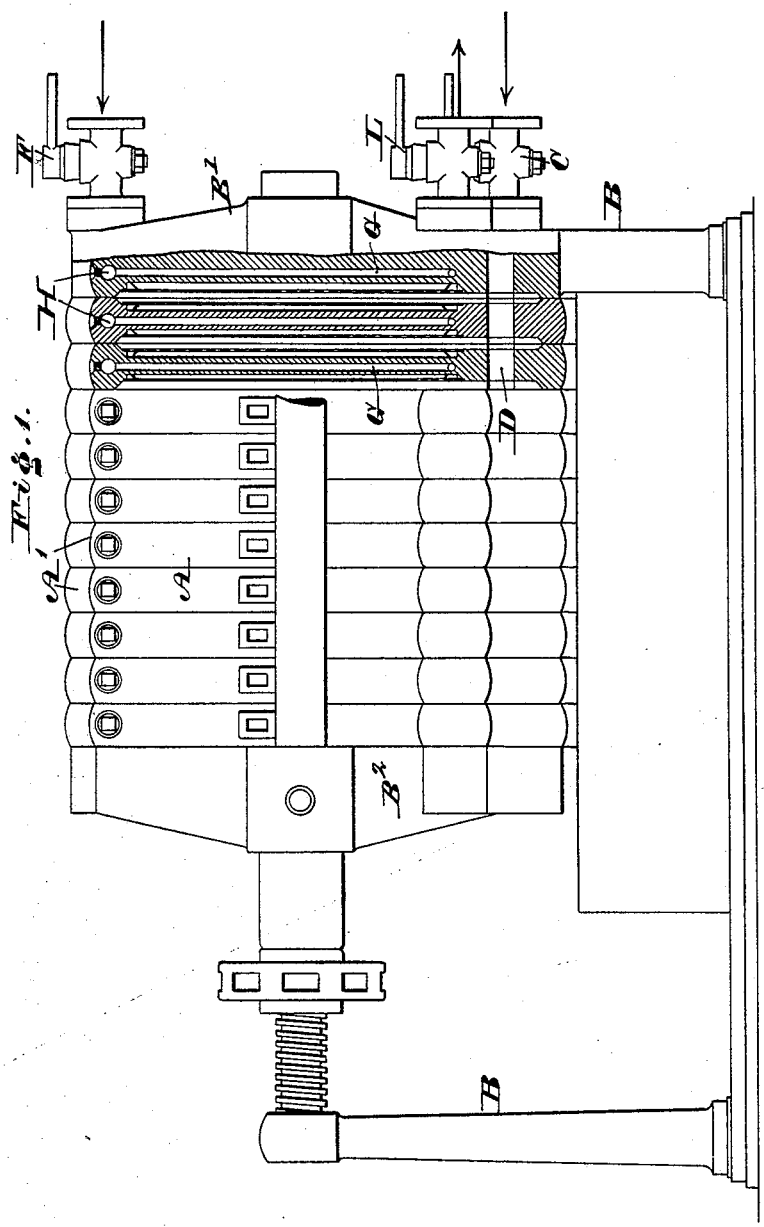
WITNESSES:
Theo. Rollé.
James G. Kelly.
INVENTOR:
Fritz Kleemann
BY Niederhofer + Kintner
ATTORNEYS.

(No Model.) 3 Sheets—Sheet 2.
F. KLEEMANN.
FILTER PRESS.
No. 434,831. Patented Aug. 19, 1890.
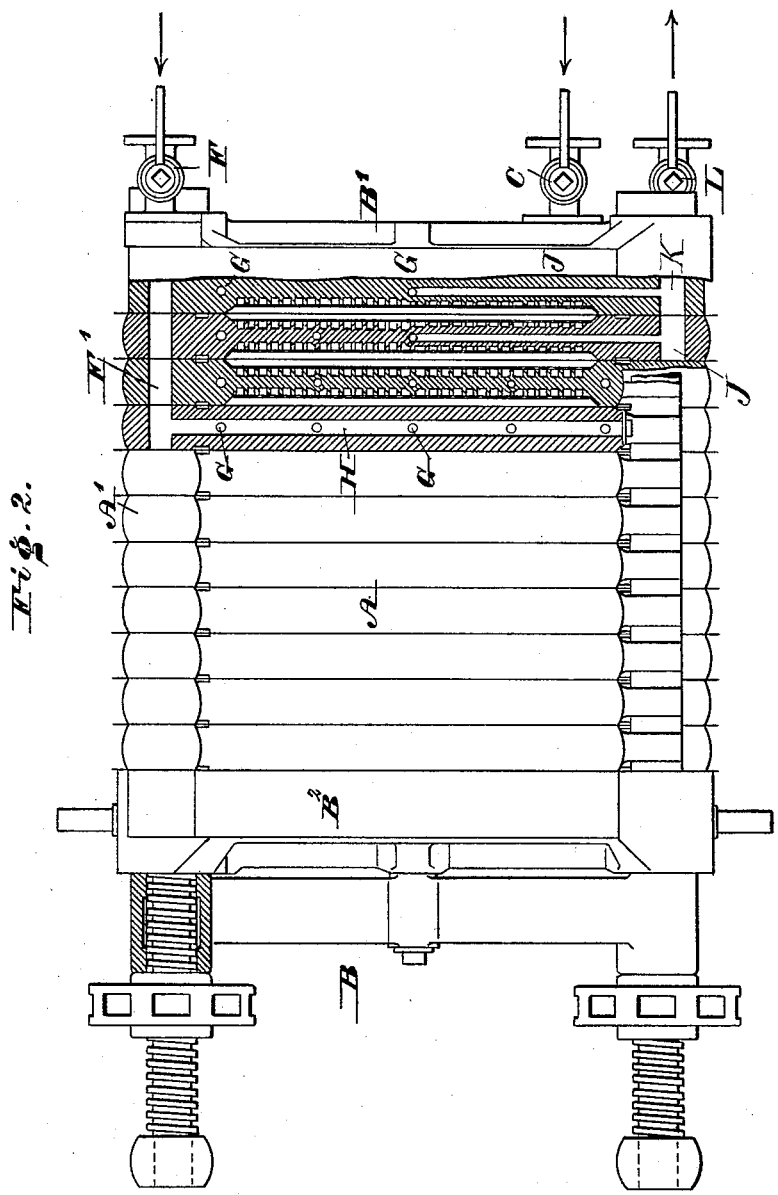
WITNESSES:
Theo. Rollé.
James F. Kelly
INVENTOR:
Fritz Kleemann
BY
ATTORNEYS.

(No Model.) 3 Sheets—Sheet 3.
F. KLEEMANN.
FILTER PRESS.
No. 434,831. Patented Aug. 19, 1890.
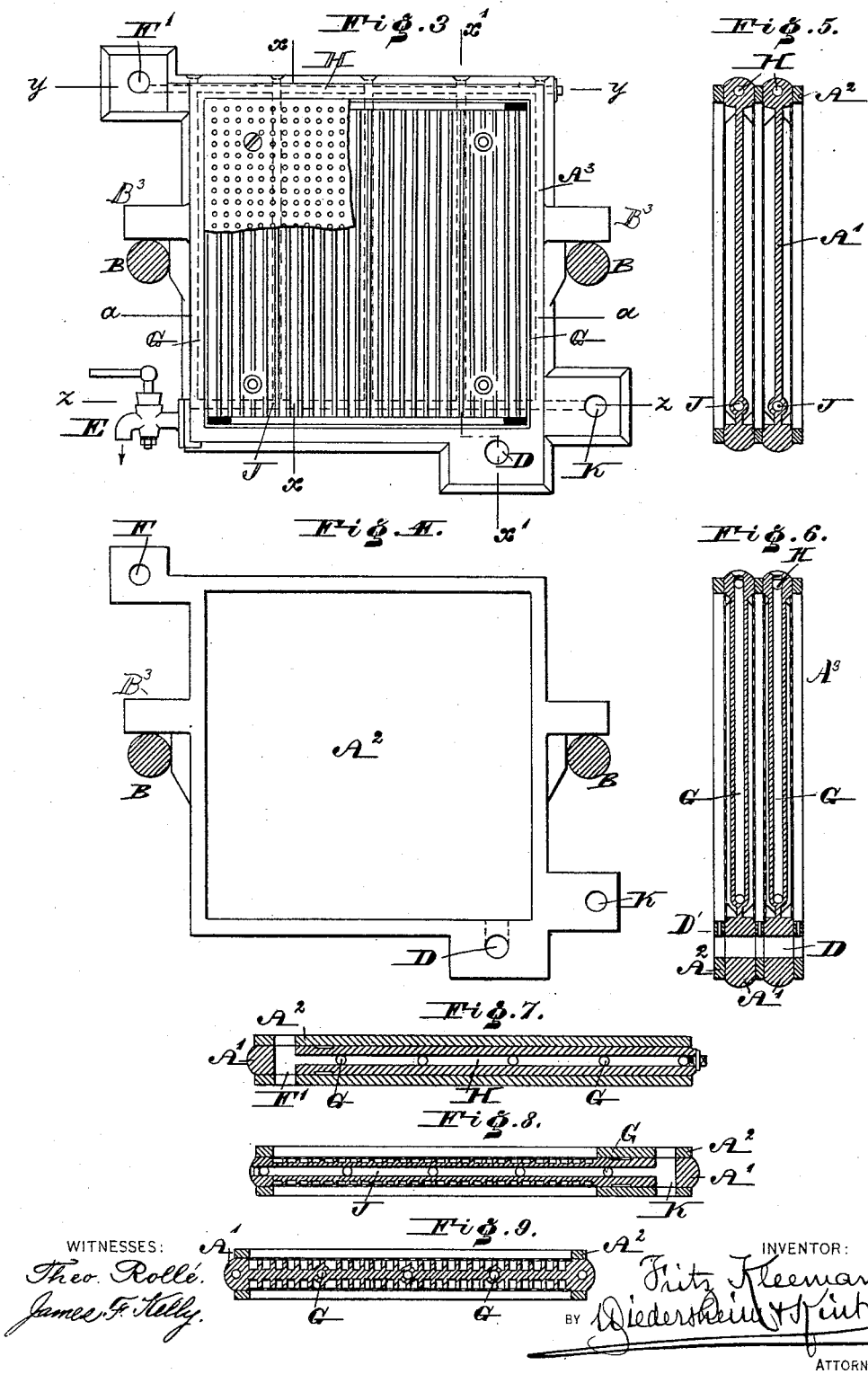
WITNESSES:
Theo. Rollé.
James F. Kelly.
INVENTOR:
Fritz Kleemann
BY Diederstein + ?
ATTORNEYS.

UNITED STATES PATENT OFFICE.

FRITZ KLEEMANN, OF SCHOENINGEN, GERMANY.

FILTER-PRESS.

SPECIFICATION forming part of Letters Patent No. 434,831, dated August 19, 1890.

Application filed July 21, 1888. Serial No. 280,636. (No model.)

*To all whom it may concern:*

Be it known that I, FRITZ KLEEMANN, a subject of the Emperor of Germany, residing at Schoeningen, Braunschweig, Germany, have invented a new and useful Improvement in Filter-Presses, which improvement is fully set forth in the following specification and accompanying drawings.

My invention consists of a filter-press or mechanical filter provided with means for directing a heating or cooling medium through the filter plates or frames, as will be hereinafter set forth.

Figure 1 represents a partial side elevation and partial vertical section of a chamber filter-press embodying my invention. Fig. 2 represents a partial plan view and partial horizontal section thereof. Fig. 3 represents a face view of one filter-plate of a frame filter-press embodying my invention. Fig. 4 represents a face view of a frame of a filter-press. Fig. 5 represents a vertical section on line $x\,x$, Fig. 3. Fig. 6 represents a vertical section on line $x'\,x'$, Fig. 3. Figs. 7, 8, and 9 represent horizontal sections on lines $y\,y$, $z\,z$, $a\,a$, respectively, Fig. 3.

Similar letters of reference indicate corresponding parts in the several figures.

Referring to the drawings, A represents a series of filter-plates of a chamber filter-press, consisting of plates A', both faces of said plates A' being recessed, so that a chamber is formed between each two plates. The walls of these plates A' are vertically grooved and provided with perforated metal sheets similar to the plates $A^3$ of a frame filter-press shown in Figs. 3, 5, 6, 7, 8, and 9. It is readily understood that instead of the chamber filter-plates A' the filter-plates $A^3$ and frames $A^2$, Figs. 3 and 9, may be placed in the stand B. The plates A', $A^3$, and the frames $A^2$ are placed between the stationary end plate B' and the movable end plate $B^2$, being supported on a frame or stand B by means of the arms $B^3$, which project from the sides of said frames $A^2$ and chamber filter-plates A', and provided with a supply-pipe C, distributing-channel D, and discharge-cock E.

The features thus far described may be similar to those shown in application for patents heretofore filed by me on the 11th day of July, 1888.

Connected with the head of the press to which the supply-pipe C is secured is a cock or valve F, which communicates with a horizontal longitudinal passage F', formed in the top borders of one side of the plates and frames, (see Figs. 2 and 3,) said passage F' communicating with transverse horizontal passages H in the upper part of said plates A'. The passages H communicate with vertical passages G in the plates A' $A^3$, and said passages communicate with horizontal passages J at the bottom of said plates, the said passages J leading into the passage K. (See Figs. 3 and 8.)

Connected with the press and at one end thereof, and in communication with the passage K, is a discharge cock or valve L.

It will be seen that the material to be filtered is admitted into the press by the supply-pipe C, and after passing through the frames A by way of the distributing-channel D, passages D', and out through cock E, is discharged filtered at the cock or valve E.

Should it be desired to heat or cool the plates for any purpose requiring such action, a heating or cooling medium is admitted at the cock or valve F, and directed from the same through the passages F', G, H, and J and discharged at the cock or valve L, it being evident that the plates are heated or cooled, as the case may be, by the medium directed through the same.

Having thus described my invention, what I claim as new, and desire to secure by Letters Patent, is—

A filter-press having filter plates and frames with channels for passing through the same the fluid to be filtered, said plates having openings forming a continuous longitudinal passage, horizontal passages leading from said longitudinal passage, vertical passages leading from the upper horizontal passage, and horizontal passages in the lower portions communicating with the vertical passages, and an outlet whereby a stream of water may be continuously passed within the plates, said parts being combined substantially as and for the purpose set forth.

FRITZ KLEEMANN.

Witnesses:
JOHN A. WIEDERSHEIM,
JAMES F. KELLY.